United States Patent [19]

McCoy et al.

[11] Patent Number: 4,724,824
[45] Date of Patent: Feb. 16, 1988

[54] INSTANTANEOUS STEAM GENERATOR

[75] Inventors: James M. McCoy, Everett; Michael G. Gonhue, Arlington, both of Wash.

[73] Assignee: The Lucks Company, Seattle, Wash.

[21] Appl. No.: 899,445

[22] Filed: Aug. 22, 1986

[51] Int. Cl.⁴ .............................................. F24H 9/00
[52] U.S. Cl. ................................. 126/348; 126/369;
122/39; 219/275
[58] Field of Search ...................... 126/348, 369, 20;
219/273–276; 122/39; 99/467, 468

[56] References Cited

U.S. PATENT DOCUMENTS

| | | | |
|---|---|---|---|
| 177,226 | 5/1876 | Dougal | 126/348 |
| 1,293,477 | 2/1919 | Kummerow | 126/20 |
| 1,325,559 | 12/1919 | Eckelmann | 219/271 |
| 1,380,689 | 6/1921 | Thiele | 422/26 |
| 1,484,857 | 2/1924 | Alexander et al. | 122/39 X |
| 1,676,763 | 7/1928 | Anetsberger et al. | 126/369 |
| 3,406,097 | 10/1968 | Port et al. | 219/275 X |
| 3,447,337 | 6/1969 | Skruch et al. | 62/318 |
| 3,518,949 | 7/1970 | Stock | 99/468 |
| 3,990,432 | 11/1976 | Haynes et al. | 126/378 |
| 4,202,259 | 5/1980 | Johansson | 99/352 |
| 4,367,724 | 1/1983 | Willett | 126/24 |
| 4,373,430 | 2/1983 | Allen | 99/468 |
| 4,578,563 | 3/1986 | Eguchi et al. | 219/273 |
| 4,599,859 | 7/1986 | Urso | 60/514 |
| 4,646,630 | 3/1987 | McCoy et al. | 99/468 |

Primary Examiner—Samuel Scott
Assistant Examiner—Allen J. Flanigan
Attorney, Agent, or Firm—Seed and Berry

[57] ABSTRACT

An instantaneous steam generator is disclosed which has a plurality of heated channels having open tops. Each channel has a base having a steam generation surface with substantially parallel, sharp transverse ridges. The steam generation surface is heated to a temperature substantially above that at which an insulating vapor barrier forms between the surface and a water layer thereabove. The water flow is directed transversely over the ridges so that the vapor layer is separated from the water layer above and so that the water is instantaneously converted into steam rather than riding on an insulating layer of water vapor. The channels can be enclosed in a box having openings. The box is pressurized by a blower drawing relatively cool, ambient air so that relatively wet steam is distributed throughout the entire interior volume of a large oven. Control apparatus for heating the channels and controlling the water flow thereto are described. The instantaneous steam generator has a short regeneration period which allows re-steaming of an oven during a baking cycle.

18 Claims, 6 Drawing Figures

INSTANTANEOUS STEAM GENERATOR

DESCRIPTION

1. Technical Field

This invention relates to self-contained steam generation devices and methods for generating steam. More specifically, the invention relates to a method and an apparatus for instantaneously generating steam for use in baking ovens.

2. Background Art

It is well known in the baking art that the production of French bread and other crusty-type bread products often requires the introduction of steam into the baking oven at the outset of a baking cycle. This step aids in obtaining the desired loaf characteristics, glossy appearance and crispness of the crust of the bread.

French bread is typically produced in forced convection ovens employing a plurality of parallel baking racks. Forced convection ovens have a positive circulation of heated air to transfer heat energy to the baking product. Steam generators have been provided for this type of oven which often comprise a large heat sink made out of construction reinforcing bar or metallic spheres (see U.S. Pat. No. 4,202,259, to Johansson) which is placed within the oven chamber and heated by the ambient temperature of the oven. At a desired time in the baking cycle, water is sprayed over the heat sink and steam is generated up to the point that the heat sink's surface temperature drops too low.

It is important in the successful baking of French bread or other baked products having a similar crust that the steaming be successfully completed at an early stage during the baking cycle. Gluten in the unbaked product migrates to the surface thereof and produces the desired crust if sufficient water is present on the surface. To provide sufficient water on the surface of the product, relatively cool, wet steam is preferably delivered to the product before the surface temperature of the product exceeds approximately 180° F. If sufficient steam is not generated early enough during the baking cycle, then the desired loaf characteristics, glossy appearance and crust crispness will not be achieved.

Forced convection rack ovens are typically the size of a small coat closet. Therefore, it is relatively easy to obtain sufficient quantities of steam from the steamer mechanism described above to fill the entire baking cavity with sufficient steam early enough in the baking cycle. If, however, sufficient steam is not generated, then the recovery time of such systems, usually on the order of 20 minutes, is too long to allow successful re-steaming within the baking cycle.

Because of the critical timing and steam quantities required to successfully produce French bread, large revolving tray ovens are not typically used for making this type of product. Revolving tray ovens typically have an interior volume approximately four times larger than the interior volume of comparable forced convection rack ovens and employ a large carousel which rotates about a horizontal axis. A door on the front of the oven allows access to each tray sequentially as the carousel rotates. The trays are typically pivotally mounted to the carousel to maintain their horizontal attitude. Revolving tray ovens are often preferred by bakers because of their flexibility. In contrast to forced convection rack ovens, revolving tray ovens depend on natural convection and radiated heat from burners to bake products on rotating trays. There are products such as cakes and confections which do not bake well in forced convection ovens, but which bake well in revolving tray ovens. Therefore, a greater variety of products can be produced in revolving tray ovens. Furthermore, different products can be baked simultaneously in revolving tray ovens by inserting and removing products as the trays revolve to vary individual product baking times.

The relatively large volume of revolving tray ovens, coupled with their lack of a forced-air system, have precluded the use of self-contained steamers in such ovens. It is not feasible to merely increase the size of the passive-type, heat sink steam generator discussed above for use in revolving tray ovens. The resulting mass of such a system would be exceedingly large and would require an excessive amount of time to heat up to the operating temperature of the oven. The recovery time of such a system would be even slower than systems used in smaller, convection-type rack ovens (perhaps on the order of several hours). This would preclude any possibility of re-steaming the product if the first steaming was unsuccessful and would preclude steaming the next product batch assuming a baking cycle of approximately forty-five minutes. Furthermore, it would be difficult to distribute steam from such a large heat sink throughout the interior volume of the oven.

External steam boilers have been used to supply steam to revolving tray ovens for the production of French bread and other crusty-type bread products. However, a number of disadvantages are associated with the use of such external boilers. External boilers often operate at elevated pressures and are subject to burdensome regulatory laws. The boilers require regular maintenance, and may require water treatment, removal of scale buildup, heat exchanger cleaning and blowdown to eliminate sludge which results from the water treatment. Boilers are also relatively inefficient at quickly converting large quantities of water into steam.

A limitation in the design of all prior art steam generators is the temperature at which such generators can operate. The heat-sink-type steam generator used in conventional convection rack ovens is heated by the ambient temperature of the oven, which is at approximately 400° F. In adapting such a system to larger revolving tray ovens, one relatively simple solution to increasing the efficiency of such a generator has been thwarted by a somewhat surprising physical limitation. It would seem that by merely increasing the temperature of the heat sinks, additional steam could be generated from the same mass of heat sink material. However, it is known that the efficiency of phase change from liquid to vapor actually decreases at heat sink temperatures substantially above the boiling point of water. This effect is known as the "Leidenfrost effect" and is due to the formation of a vapor barrier at the heated surface which insulates water above the vapor layer from the heated surface below the vapor layer. This process was first reported and explained by G. J. Leidenfrost in 1756. A thorough discussion of the Leidenfrost effect is found in *Analysis of Heat and Mass Transfer* by E. R. G. Eckert and Robert M. Drake, Jr., Mc-Graw Hill Book Co., 1972, page 557. Therefore, increasing the temperature of prior art heat-sink-type steam generators above the typical oven operating temperature is counterproductive and cannot be used to make such generators effective for use in large revolving tray ovens.

Therefore, a need exists for a steam generator which can generate sufficient quantities of steam to fill the interior cavity of a revolving tray oven without using an excessively large or massive heat sink. The desired steam generator would have a quick recovery time.

DISCLOSURE OF THE INVENTION

It is an object of the present invention to provide an instantaneous steam generation apparatus and method which can quickly generate sufficient steam to fill a large revolving tray oven.

It is a further object of the present invention to achieve the above object with a steam generation system having a recovery time on the order of a few minutes.

It is yet another object of the present invention to generate steam efficiently from surfaces heated to temperatures in excess of 400° F.

The invention achieves these and other objects and advantages which will become apparent from the description which follows by employing a relatively low mass heat sink which is heated to temperatures in excess of 400° F. The heat sink has a steam generation surface which separates an insulating vapor layer formed at the steam generation surface from a water layer thereabove. The heat sink can be quickly reheated after the introduction of water thereto so that re-steaming is possible within a few minutes.

In the preferred embodiment, the heat sink steam generation surface is provided with a plurality of adjacent, substantially parallel, sharp ridges and structure for directing a flow of water transversely over the sharp ridges. The ridges serve to separate the insulating vapor layer from the water layer thereabove. Sharp ridges are formed by depressions in the steam generation surface. Each depression is provided with a bottom below a mean level of the steam generation surface and an adjacent, substantially planar land area above the mean level of the steam generation surface. A substantially planar forward wall joins the bottom and the adjacent land area. The land area and the forward wall meet at approximately a right angle to form a sharp ridge.

In the preferred embodiment, the heat sink forms a channel having an open top defined by an elongated rectangular base having elongated sides and transverse ends. Two elongated sidewalls extend from the base and are connected at one end of the base by an end wall. One end of each of the channels is provided with a drain so that water which is not converted into steam can be removed from the channel. Steam generated by the channels exits the box through apertures in the box. A plurality of channels are vertically disposed at an angle in a steamer box so that water which is not converted to steam drains from channel to channel and out of the box through a drain opening at the bottom thereof.

A blower can be provided which forces substantially ambient temperature air through the steamer box and throughout the oven cavity when water is introduced into the channels. The blower also cools the steam to produce saturated, "wet" steam which more readily condenses on the product. Conventional control devices are provided to control the blower, heating of the steamer channels and the introduction of water thereto.

In an alternate embodiment of the invention, one channel, having a closed top, is used to provide steam for a deck-type oven. The cover allows steam pressure to force the generated steam into the oven deck without the use of a blower.

BEST MODE FOR CARRYING OUT THE INVENTION

Figure 1:
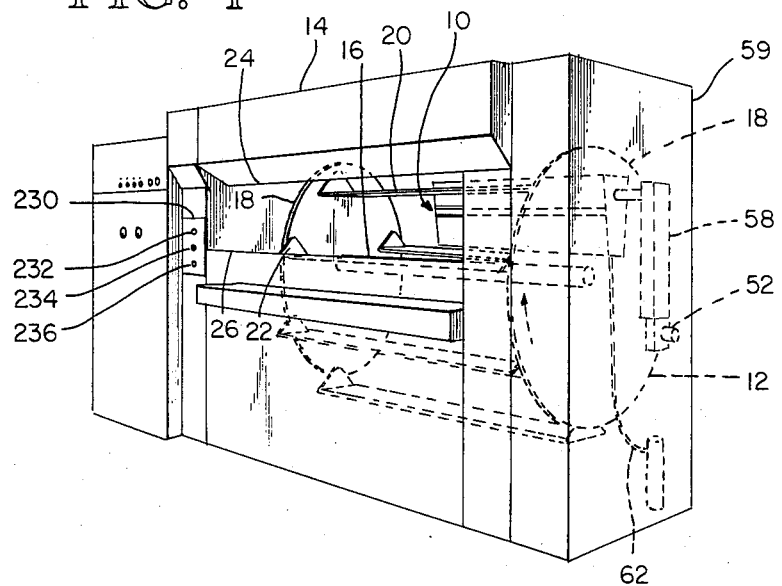
FIG. 1 is an isometric view of a typical revolving tray oven having a rotating carousel. The instantaneous steam generator of the present invention is shown behind the rotating carousel.

In FIG. 1, a self-contained, instantaneous steam generator, in accordance with the preferred embodiment of the present invention, is generally indicated at reference numeral 10 behind a rotating carousel 12 of a typical revolving tray oven 14. The carousel rotates on a substantially horizontal axle 16 which has wheels 18 connected at the ends thereof. Trays 20 are pivotally connected to the wheels 18 by pivot mounts 22 so that the trays maintain their horizontal attitude while the carousel 12 rotates. The oven has a conventional control panel (not shown) which controls the rotation of the carousel and the temperature of the oven. Rotation of the carousel can be stopped so that access to the trays 20 is available through an opening 24 in the front of the oven. The opening 24 can be sealed, such as with a sliding door 26.

The revolving tray oven 14 has an interior volume which is approximately equal to that of a small room. Because of the large size of the oven, it is extremely difficult to fill the entire interior cavity with steam, as is required in the production of French bread and other products having a hard crust.

The instantaneous steam generator 10 of the present invention provides sufficient steam to quickly fill the entire interior cavity of the oven with steam over a prolonged period. The baker is thus provided with a steaming ability which will allow successful steaming to occur whether the baker steams the product while it is loaded onto the trays, alternately steams and loads trays individually, or loads all the trays and then steams the product. The invention also allows the baker to precondition the oven with steam, load the product, and then steam the oven again within approximately four minutes of the precondition steaming. The instantaneous steam generator also quickly recovers so that the interior cavity can be re-steamed in approximately four minutes if, for example, the first steaming is unsuccessful.

The instantaneous steam generator 10 is located inside the oven, such as in the upper rear corner of the oven interior cavity. The instantaneous steam generator is relatively compact in order to fit into the small space available in this part of the oven. The carousel occupies most of the interior space in the oven. The minimum clearance between the periphery of the carousel and the oven back wall is approximately six inches. At the top of the oven cavity, clearance between the carousel periphery and the top corner of the oven is approximately twelve inches. The instantaneous steam generator of the present invention is designed to fit within this clearance without interfering with the rotation of the carousel. The steam generator can be furnished with the oven as part of the original equipment or added to existing ovens.

Figure 2:
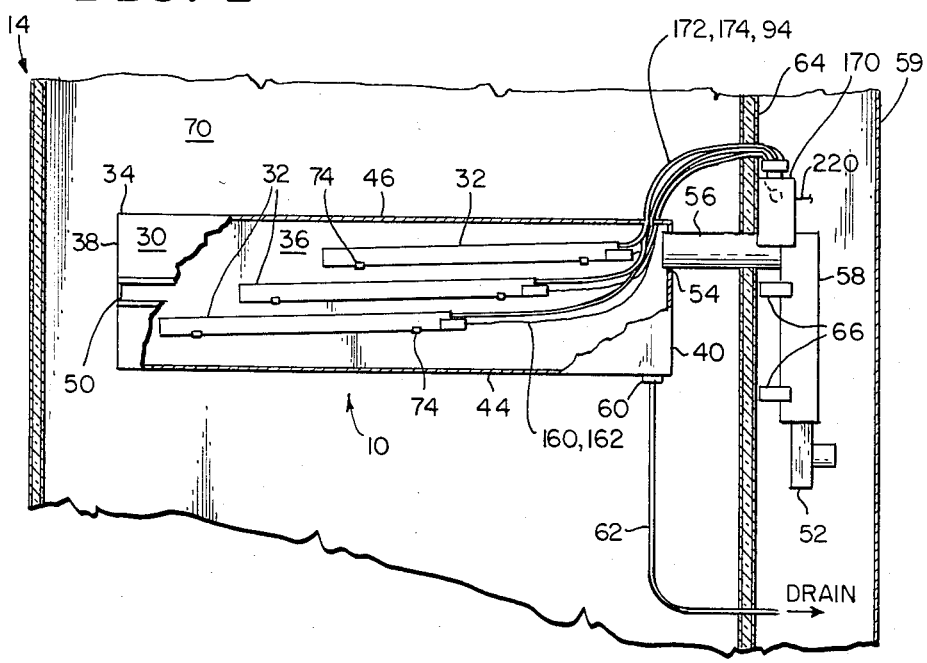
FIG. 2 is an enlarged fragmentary view of the oven and instantaneous steam generator shown in FIG. 1, with a portion of the steamer box cut away to reveal the heat sink channels.

The instantaneous steam generator 10 is shown in FIG. 2 with a protion of a front panel 30 cut away. The steam generator has a plurality of steamer channels 32 which generate steam and which reside in a steamer box 34. In addition to the front wall 30, the steamer box has a rear wall 36, a left sidewall 38, a right sidewall 40, a bottom wall 44, and a top wall 46.

The front wall has a slot 50, having a length approximately equal to the length of the tray, to allow generated steam to escape therethrough. The generated steam exits the slot in a high velocity blanket which immediately covers an adjacent tray and which fills the entire oven cavity with steam.

A blower 52, which is connected to an aperture 54 in the right sidewall 40 by conduits 56 and 58, pressurizes the steamer box 34 with relatively cool, ambient air. The ambient air is drawn from outside the heated oven compartment, such as from an open top machinery compartment 59 on one side of the oven. The pressure created in the steam box forces the steam, generated in the steamer box as described below, out of the steamer box through the slot 50. The conduit 58 is mounted to an insulating wall 64 of the revolving tray oven 14 by brackets 66. The conduit 56 penetrates the insulating wall 64 to join the conduit 58 with the steamer box 34 interior.

The steamer box is mounted to the back wall 70 of the oven 14. The steamer channels 32 are mounted to the rear wall 36 of the steamer box 34 by brackets 74. The steamer channels are mounted within the steamer box at an angle to the horizontal and are positioned vertically above one another, as will be described more fully below.

As shown in FIG. 2, three channels 32 are provided in the steamer box 34. More or fewer channels can be provided and their sizes can be varied, depending upon the volume of oven and the quantity of steam which is desired.

Figure 3:
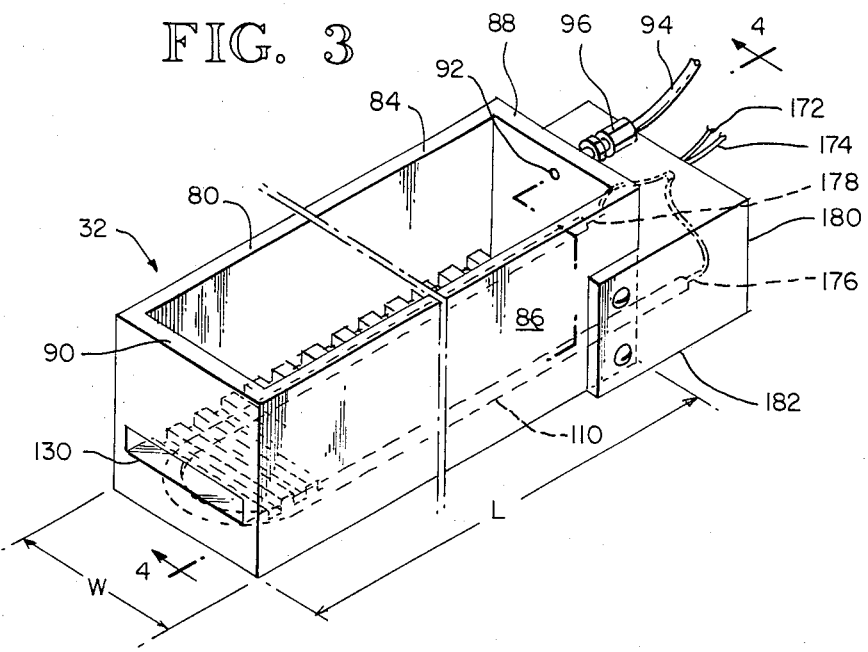
FIG. 3 is an enlarged isometric view of one of the channels, shown foreshortened.
Figure 4:
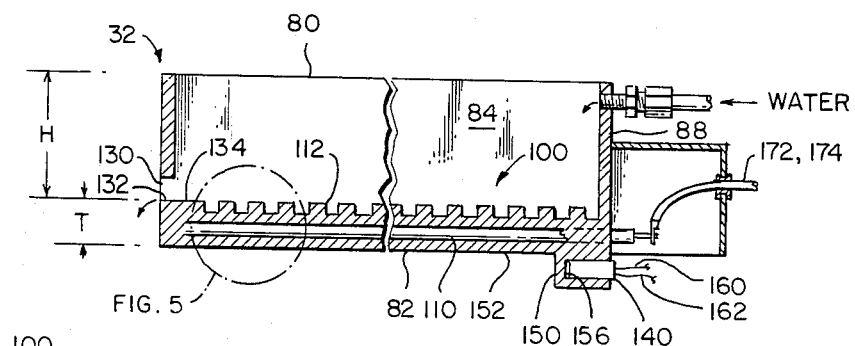
FIG. 4 is a sectional view of the channel in FIG. 3 taken along line 4—4 from FIG. 3.

An enlarged sectional isometric view of a steamer channel (generally indicated at reference numeral 32) is shown in FIG. 3. A sectional view of the steamer channel shown in FIG. 3, taken generally along line 4—4 of FIG. 3, is shown in FIG. 4. The channel has an open top 80 which is defined by an elongated, substantially rectangular base 82 having elongated sidewalls 84 and 86, a rear end wall 88, and a forward end wall 90 connected to the rectangular base 82 around the perimeter thereof. The rear end wall has an opening 92 for introducing a water flow into the channel. The water flow is provided through a water conduit 94 which is connected to the opening 92 by a coupling 96.

Water entering the channel 32 through the opening 92 impinges upon a steam generation surface, generally indicated at reference numeral 100, located on the elongated, substantially rectangular base 82 and between the elongated sidewalls 84, 86 and end walls 88, 90. A resistive heating element 110 is embedded in the elongated, substantially rectangular base 82. The heating element heats the base, and therefore the steam generation surface, to a preferred temperature in the range of 450° F. to 500° F. A suitable heating element is manufactured by Watlow, Batavia, Ill., and generates 1 to 8 kilowatts at 208 volts.

Water impinging upon a steam generation surface, operating at a temperature in the above-described range, would vaporize relatively slowly due to the formation of an insulating vapor barrier at the steam generation surface, i.e., due to the Leidenfrost effect. The steam generation surface is therefore provided with irregularities, preferably in the form of a plurality of substantially parallel ridges 112 which are transverse to the elongated dimension of the rectangular base 82. The ridges are formed by depressions, generally indicated at reference numeral 114, in the steam generation surface 100. Each depression has a bottom, such as planar bottom 116, which is located below a mean level 124 of the steam generation surface, and an adjacent, preferably substantially planar land area 118 above the mean level of the steam generation surface. The bottom and planar land area are joined by a substantially planar forward wall 120 which forms a right angle with the planar land area 118 to form the sharp ridge 112.

The sharp ridge 112 serves to separate an insulating layer of water vapor formed in the depression 114 from a layer of liquid water thereabove. The channels 32 are inclined at a preferred angle of approximately 1.75 degrees to the horizontal by the positioning of brackets 74 relative to the steamer box rear wall 36 and oven back wall 70. This causes water introduced into the channels 32 through the water conduit 94 and opening 92 to cascade over the ridges, while the elongated sidewalls 84 and 86 direct the water flow transversely over the ridges.

This structure causes a dynamically violent production of steam to occur at steam generation surface temperatures substantially above temperatures where an insulating vapor layer is known to form on a heated surface. Thus, with the present invention it is possible to achieve efficient, instantaneous steam generation by increasing the temperature of the steam generation surface, whereas previously, increasing the temperature of a heated surface substantially above the boiling point resulted in less rapid vaporization.

The sharpness of the ridges 112 is critical to effectively separating the insulating vapor layer formed from the water layer thereabove and cause the desired explosive generation of steam. It has been found that the use of a curved ridge 112 is insufficient for this purpose. Currently, the depressions and sharp ridges 112 are formed by casting the elongated, substantially rectangular base 82, sidewalls 84, 86 and end walls 88, 90 separately and then cutting the depressions 114 into the steam generation surface 100 on the rectangular base with a saw. The channels are preferably made of aluminum because of its favorable heat-transfer characteristics. The sidewalls and end walls are then joined to the rectangular base 82 and to one another, as shown in FIG. 3, such as by tungsten inert gas welding. It is believed that sufficient sharpness for the ridges 112 can also be achieved by casting the channel 32 as a unit with depressions having rounded edges on the steam generation surface 100. The rounded edges can then be milled off to form the sharp ridges 112 shown in the figures. Substantial deviation from a right angle between the planar land areas 118 and forward walls 120 can result in a decreased efficiency in separating the insulating vapor barrier from the water thereabove.

The depressions 114 have a substantially planar rearward wall 122 which is substantially parallel to and spaced from the planar forward wall 120. The junction between the rearward wall 122 and the adjacent land area 118 is not believed to be critical to the efficiency of the vapor layer separation process. The right angle shown in FIG. 5 between the rearward wall 122 and an adjacent planar land area 118 is merely the result of the cutting process. It is believed that deviation from the junction shown would not result in a substantial reduction in separation efficiency. For example, it is believed that sawtooth-shaped depressions would be effective in separating the insulating vapor barrier formed at the steam generation surface from the water layer thereabove so long as the junction between the substantially planar forward wall 120 and adjacent, substantially planar land area 118 form a sharp ridge 112.

Figure 5:
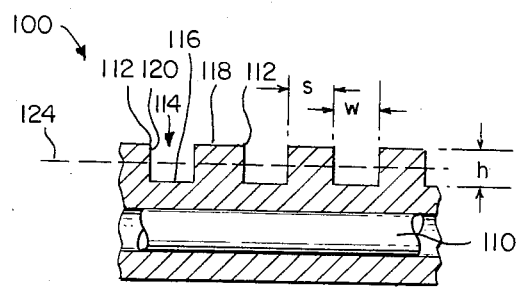
FIG. 5 is an enlarged, partial sectional view of circled area 5 in FIG. 4.

In the preferred embodiment shown in FIG. 5, the width w of the bottom 116, defined by the distance between a planar forward wall 120 and a corresponding planar rearward wall 122, is approximately 0.180 inch. The height h, defined by the distance between a bottom 116 and an adjacent, substantially planar land area 118, is approximately 0.090 inch.

The separation distance s between adjacent depressions 114, defined by the planar land areas 118, is not critical. However, optimal efficiencies have been achieved when using land areas having dimensions in the range of 0.18 to 0.036 inch. The width w of the depression defined by the bottom 116 is also not believed to be critical. However, optimal efficiencies have been found when using dimensions w within 10 to 20 percent of the dimensions given above.

The height h of the forward walls 120 has been found to be critical. If the forward wall had a dimension h substantially in excess of 0.090 inch, residual water tends to pool in the depressions. Such residual water boils slowly over an insulating vapor layer as previously described and is therefore highly undesirable. A height h which is substantially less than 0.090 inch has also been found to reduce the ability to successfully separate the insulating vapor barrier from the water above.

As previously stated, the rearward wall 122 is merely the result of the cutting or milling process which forms the depressions 114. The height of the rearward walls 122 is not critical as the rearward wall does not perform a separation function, as do the ridges 112 which are formed by the junction between the forward walls 120 and planar land areas 118.

In the preferred embodiment shown in FIGS. 1–5, the channels 32 have a length L between approximately 24 to 48 inches. The channels have a transverse width W of approximately 2 to 6 inches. The sidewalls 82, 84 and end walls 88, 90 have a height H of approximately 2 to 6 inches, as best seen in FIG. 4, above the mean level of the steam generation surface 100. The elongated, substantially rectangular base 82 has a thickness T of approximately one inch.

It is highly undesirable to allow unvaporized water to remain in the channels 32 at the end of a steaming cycle. Residual water in the channels substantially increases the recovery period of the instantaneous steam generator 10 because of the relatively large latent heat of vaporization of water. Therefore, the forward end wall 90 of each channel 32 is provided with a drain opening, such as rectangular drain opening 130, to remove unvaporized water from the channel. The drain opening has a side 132 which is flush with an extension 134 of the adjacent land area 118 on the steam generation surface 100. As shown in FIG. 2 and described above, the channels 32 are inclined within the steamer box 34 with reference to the horizontal. Water, which enters the channel through opening 92, cascades over the steam generation surface 100 and is guided by the sidewalls 82, 84 and the rearward end wall 88 towards the drain opening 130. Any water which has not been converted to steam by the time it reaches the forward end wall 909 exits the channels 32 through the drain opening 130 and enters the open top 80 of the next lower adjacent channel. Any water which exits the lowermost channel 32, shown in FIG. 2, impinges upon the bottom 44 of the steamer box 34 and is removed from the steamer box through the drain 60 and drain conduit 62 to exit the oven 14.

The temperature of the steamer channels, mass, temperature and dimensions thereof, and flow rate of water introduced into the channels are carefully controlled so that substantially all of the water entering the channels is converted to steam and very little water is left to drain out through the drain openings 130 and steamer box drain conduit 62. It has been found that the vigorous, explosive boiling which occurs in the channels, and the thermal shock caused by the relatively cool water impinging upon the heated surface, removes any scale or encrustations which might accumulate on the steam generation surface and which would decrease the efficiency thereof. Therefore, the channels are self-cleaning and self-sloughing.

Current flow through the resistive heating element 110, and thus the temperature of the channels 32, is controlled by a conventional thermostat 140 in each channel, as best seen in FIG. 4. The thermostat is received in an aluminum node 150, which is cast or welded, such as by tungsten inert gas welding, to the outside 152 of the elongated, substantially rectangular base 82 near the rear end wall 88. A suitable thermostat is manufactured by Watlow, Batavia, Ill., and has a cylindrical exterior which is closely received in a cylindrical cavity 156 in the aluminum node 150. The thermostat is of the normally closed type and has a bimetallic strip which opens the circuit when the preselected temperature is achieved. The preselected temperature can be selected by a set screw (not shown) in the thermostat. In the preferred embodiment, for ovens which typically operate at temperatures of approximately 400° F., the set screw is adjusted so that the thermostat opens at a temperature between approximately 475° F. to 500° F. Other normally closed thermostats can be substituted.

The thermostat 140 follows the temperature of the resistive heating element 110 by a few degrees so that the selected set point of the thermostat need not be substantially different from the desired temperature for operation of the channels 32.

The thermostats 140 in the channels 32 are connected to one another through their electrical contacts 160, 162 in series. The ends of the series circuit are delivered to a conventional control box 170, as shown in FIG. 2. The electrical leads 172, 174 of the resistive heating elements 110 are also delivered to the control box 170 and are connected to a conventional relay (not shown) which is controlled by the series circuit including the thermostats 140.

Contact ends 176, 178 of the resistive heating elements 110 are protected by a cover 180 which is secured to the channels 32 near the rear end wall 88 of the channel by fasteners 182, such as screws, or by any other suitable means. The cover 180 also supports the electrical leads 172, 174 of the resistive heating elements 110 with a heatresistive grommet 210.

The resistive heating elements 110 are powered by, for example, 208 volt to 220 volt current, while the series circuit including the thermostats 140 is energized by, for example, a 110 volt current. The above-described circuit is entirely conventional and will be well understood by those skilled in the art, except for the desirability of series wiring of the thermostats. It has been found that by wiring the thermostats in series, failure of any one of the thermostats (i.e., failure of any one of the thermostats to open when the desired preselected temperature is achieved) will not cause one of the resistive heating elements 110 to remain energized if any one of the other channels 32 has achieved the desired temperature. It has been found that an undesirable overheating condition can result if the thermostats 140 are operated in parallel and if one of the thermostats fails.

A multiconductor cable, schematically illustrated at reference numeral 220 in FIG. 2, provides electrical continuity between the described circuit in the control box 170 to a control panel 230 on the revolving tray oven 14, as shown in FIG. 1. The control panel 230 has a wait light 232, a water flow enable switch 234, and an on/off switch 236. The wait light 232 is wired in series with the thermostats 140 so that the light is illuminated whenever the normally closed contacts of the thermostat are closed. That is, the wait light indicates when the resistive heating elements 110 are heating. This occurs only when the channels 32 are below the desired operating temperature. Therefore, illumination of the wait light indicates to the operator that water should not yet be introduced into the channels.

When the wait light is extinguished, the channels have reached the desired operating temperature and the water flow enable switch 234 can be depressed to introduce water into the channels 32 and to start the blower 52. The water flow enable switch 234 is electrically connected to conventional solenoid-operated valves (not shown) which are associated with each water conduit 94. Depression of the water flow enable switch energizes the water flow solenoids to deliver water through the water conduits 94 to the channels 32 at a controlled flow rate. The flow rate can be preselected by appropriately selecting the inner diameter of the water conduits 94 or by including a conventional valve (not shown) in the water conduits 94.

The steaming period (the duration of water flow and blower operation) can be manually controlled by the operator or can be controlled by a conventional timer (not shown) which is energized by actuation of the water flow enable switch 234.

In the preferred embodiments described above, a preferred water flow of approximately 0.5 to 2.0 pounds of water per minute per channel is preferred. This flow rate, for each of the three channels having the above dimensions and operating in the preferred temperature range, will convert between 6 to 24 pounds of water into steam in approximately 4 minutes without leaving any substantial quantity of liquid water in the channels. Because the channels 32 have a relatively low mass (each channel weighs approximately 18 to 20 pounds), the channels 32 in the instantaneous steam generator 10 are reheated to the preselected temperature in about 4 minutes.

The preferred embodiment described above is believed to be capable of producing sufficient steam for a sufficiently long period to permit effective steaming of bagels without previous boiling of the bagels. Such a capability has been heretofore unknown with self-contained steam generation systems.

Although the preferred embodiment of the instantaneous steam generator 10 has been shown in use with a conventional revolving tray oven 14, the invention may also be modified for use in other types of ovens. For example, the channels 32 used within the steamer box 34 can be adapted for use with individual compartments of deck ovens.

Figure 6:
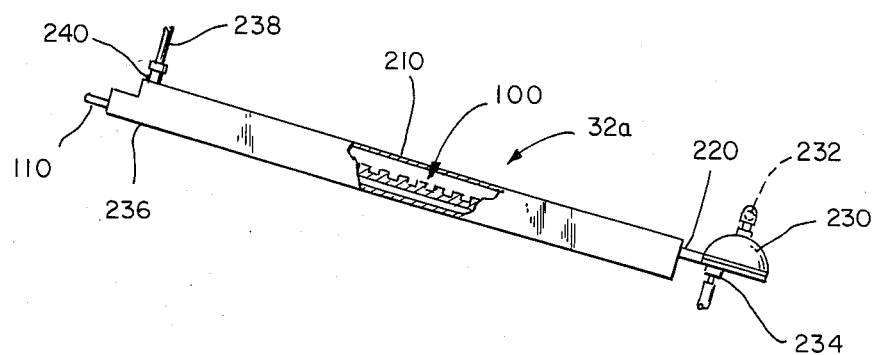
FIG. 6 is a side elevational, partially broken away view of an alternative embodiment of the invention for use with typical deck and rack ovens.

FIG. 6 shows an alternate embodiment of a channel 32a, which is similar to the channels 32 previously described, for use with a conventional deck oven or rack oven. Each compartment of a deck oven has a typical volume of approximately 15 cubic feet. In this type of oven, each deck can be provided with one channel 32a having a length of approximately 48 inches, a height of 1 inch, and a width of approximately ¾ inch. The channel 32a has an enclosed top 210 which causes steam pressure to force the generated steam from the channel 32a through aperture 220 to a liquid drainer 230. Steam exits the liquid drainer at port 232 for application to the oven compartment. Water is removed at outlet 234. Water is introduced to the channel 32a at an elevated end 236 through a conduit 28 and inlet 240 in the top 210 of the channel. Because of the relatively small size of the individual deck oven compartment, a blower is not necessary to distribute the generated steam through the oven compartment as described in the previous embodiment. Water flow rates and steaming time periods can be adjusted to produce the desired results on the product. For maximum efficiency, the dimensions discussed above for the steam generation surface 100 should be used.

The present invention, as described above, permits rapid conversion of water to steam at temperatures substantially above the temperature at which boiling efficiency decreases on a heated surface. This allows the use of a steam generation surface having a relatively low mass which can therefore be quickly reheated to the optimum operating temperature. This result is achieved by using a steam generation surface which separates the insulating vapor layer formed at the steam generation surface from the water layer thereabove and by removing any unvaporized water from the steam generation surface.

It is to be understood that reduced steam generation efficiency, but still dramatic improvements over the efficiency of prior art devices can be achieved by eliminating one or more of the features described above except the means for separating the insulating vapor layer from the water layer thereabove. For example, a less than optimally efficient steam generator, similar to the type described above, could be produced by eliminating the resistive heating element 110 and using the internal oven heat to heat the steam generation surface. Therefore, the scope of the invention is not to be limited to the above description but is to be defined by the claims which follow.

We claim:

1. An instantaneous steam generator for use in an oven comprising:
   a heat sink for absorbing heat energy, having an associated steam generation surface for receiving a flow of water and having means for separating an insulating vapor layer at the steam generation surface from water above the vapor layer when the water traverses the steam generation surface; and means for directing the water flow over the steam generation surface when the steam generation surface is heated;

wherein the vapor separating means has a plurality of adjacent, substantially parallel, sharp ridges, and wherein the water flow directing means directs the water flow transversely over the sharp ridges.

2. The instantaneous steam generator of claim 1 wherein the sharp ridges are formed by depressions in the steam generation surface, each depression having a bottom below a mean level of the steam generation surface and an adjacent, substantially planar land area above the mean level of the steam generation surface, and a substantially planar forward wall between the bottom and the adjacent land area positioned to face opposite the water flow direction, the forward wall and adjacent land area positioned substantially normal to one another to form the sharp ridge.

3. The instantaneous steam generator of claim 2 wherein the forward wall has a height of approximately 0.090 inch.

4. The instantaneous steam generator of claim 3 wherein each depression has a rearward wall spaced at least approximately 0.180 inch from the forward wall and positioned parallel thereto so as to define the width of the bottom.

5. The instantaneous steam generator of claim 4 wherein the distance between adjacent rearward and forward walls of adjacent depressions, defined by the substantially planar land area therebetween, is in the range of 0.180 to 0.360 inch.

6. The instantaneous stem generator of claim 1, including means for quickly heating the heat sink to a preselected temperature and for quickly reheating the heat sink to the preselected temperature after introduction of water onto the steam generation surface, and means for sensing the temperature of the heat sink and for controlling the operation of the heat sink quick heating and reheating means.

7. The instantaneous steam generator of claim 6 wherein the preselected temperature is between approximately 450° F. to 500° F.

8. The instantaneous steam generator of claim 1 wherein the heat sink forms a channel having an open top, including an elongated rectangular base having elongated sides and first and second substantially transverse ends, two elongated sidewalls connected to the elongated sides of the base, and an end wall connected to the first end of the base and the two sidewalls, wherein the steam generation surface is located on the elongated rectangular base between the sidewalls and water flow introducing means, positioned to introduce water at the end of the channel having the first end wall so that the elongated sidewalls and first end wall cause introduced water to flow over the steam generation surface towards the second end of the base.

9. The instantaneous steam generator of claim 8 wherein the base has a substantial thickness perpendicular to the elongated side and transverse end dimensions thereof, including an electrically resistive heating element embedded in the base under the steam generation surface to quickly heat and reheat the heatsink.

10. The instantaneous steam generator of claim 9 wherein the channel has means for draining unvaporized water from the second end of the base.

11. The instantaneous steam generator of claim 10, including a steamer box having a plurality of sides, a top and a bottom partially enclosing a volume, one of the sides having a steam aperture, and the bottom having a drain aperture, and also including a plurality of channels positioned vertically adjacent to one another inside the steamer box so that the water draining means of an upper channel can direct water through the open top of an adjacent lower channel to the steam generation surface thereof and so that the water draining means of the lowest channel can direct water to the steamer box bottom.

12. The instantaneous steam generator of claim 11, including a blower fluidly connected to the steamer box and exposed to substantially ambient air to pressurize the steamer box with the relatively ambient air to force the generated steam through the steam aperture and to cool the steam.

13. The instantaneous steam generator of claim 12, including means for inclining the channel steam generation surfaces at an angle of approximately 1 to 5 degrees relative to a horizontal.

14. The instantaneous steam generator of claim 9 wherein the channel base elongated sides have a length of approximately 24 to 48 inches, the channel base ends have a width of approximately 2 to 6 inches, the base thickness is approximately 1 inch, and the elongated sidewalls and end wall have a height from the steam generation surface of approximately 2 to 6 inches.

15. The instantaneous steam generator of claim 14 wherein the water introduction means includes means for limiting the water flow into each channel to approximately 0.5 to 2.0 pounds of water per minute for a period of approximately 1 to 4 minutes.

16. A method for instantaneously generating large quantities of steam, comprising the following steps:
heating an elongated steam generating surface having a plurality of substantially parallel, sharp ridges tranverse to the elongated dimension of the steam generation surface to a preselected temperature;
introducing a flow of water onto the steam generation surface; and
causing the introduced water to flow transversely over the ridges so that an insulating vapor layer formed at the steam generating surface is separated from a water layer above the insulating vapor layer.

17. The method of claim 16, including the step of quickly reheating the steam generation surface after the introduction of water thereto.

18. The method of claim 16 wherein the preselected temperature is in the range of 450° F. to 500° F.

* * * * *